United States Patent
Okamoto et al.

(10) Patent No.: US 9,376,545 B2
(45) Date of Patent: Jun. 28, 2016

(54) RESIN COMPOSITION, MELT-FORMED ARTICLE, MULTILAYER STRUCTURE, AND PROCESS FOR PRODUCING RESIN COMPOSITION

(75) Inventors: Shinji Okamoto, Osaka (JP); Hiroki Masumoto, Osaka (JP); Kouji Yamada, Osaka (JP); Tomonori Yoshida, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 455 days.

(21) Appl. No.: 13/057,298

(22) PCT Filed: Aug. 7, 2009

(86) PCT No.: PCT/JP2009/064068
§ 371 (c)(1),
(2), (4) Date: Feb. 3, 2011

(87) PCT Pub. No.: WO2010/016595
PCT Pub. Date: Feb. 11, 2010

(65) Prior Publication Data
US 2011/0135950 A1 Jun. 9, 2011

(30) Foreign Application Priority Data
Aug. 8, 2008 (JP) ................................. 2008-205122

(51) Int. Cl.
*C08K 5/098* (2006.01)
*C08L 29/04* (2006.01)

(52) U.S. Cl.
CPC ................ *C08K 5/098* (2013.01); *C08L 29/04* (2013.01); *Y10T 428/31736* (2015.04); *Y10T 428/31797* (2015.04); *Y10T 428/31928* (2015.04)

(58) Field of Classification Search
CPC . C08K 5/098; C08L 29/04; Y10T 428/31736; Y10T 428/31797; Y10T 428/31928
See application file for complete search history.

(56) References Cited

U.S. PATENT DOCUMENTS

| | | | |
|---|---|---|---|
| 4,613,644 A | 9/1986 | Moritani et al. | |
| 4,792,484 A | 12/1988 | Moritani | |
| 4,911,979 A * | 3/1990 | Nishimoto et al. | 428/332 |
| 2002/0045027 A1* | 4/2002 | Sawada et al. | 428/141 |
| 2008/0061270 A1 | 3/2008 | Tsuji et al. | |
| 2008/0070052 A1 | 3/2008 | Chow et al. | |
| 2009/0054717 A1 | 2/2009 | Okada et al. | |
| 2009/0075105 A1 | 3/2009 | Ono et al. | |
| 2009/0186233 A1 | 7/2009 | Masumoto et al. | |
| 2011/0020626 A1 | 1/2011 | Okamoto et al. | |

FOREIGN PATENT DOCUMENTS

| | | |
|---|---|---|
| EP | 1769845 | 4/2007 |
| JP | 01-308627 A | 12/1989 |
| JP | 06-345920 A | 12/1994 |
| JP | 08-067793 | 3/1996 |
| JP | 11-140247 | 5/1999 |
| JP | 2002-155159 A | 5/2002 |
| WO | 2005/123248 | 12/2005 |
| WO | 2010/016595 | 2/2010 |

OTHER PUBLICATIONS

U.S. Appl. No. 12/809,127 to Yasufumi Beniya et al., filed Jun. 18, 2010.
U.S. Appl. No. 13/001,808 to Shouichi Kani, filed Dec. 29, 2010.
U.S. Appl. No. 13/362,686, filed Jan. 31, 2012.
Search report from E.P.O. that issued with respect to patent family member European Patent Application No. 09805077 6, mail date is Dec. 19, 2011.
Japanese Office Action issued with respect to Japanese Application No. 2009-185245, mail date is Oct. 22, 2013.

* cited by examiner

*Primary Examiner* — Callie Shosho
*Assistant Examiner* — John Freeman
(74) *Attorney, Agent, or Firm* — Greenblum & Bernstein, P.L.C.

(57) ABSTRACT

The present invention provides a resin composition which is excellent in gas-barrier properties after a hot-water treatment and excellent in handling properties without increasing viscosity of the resin composition in a melt-kneading step at forming. The invention provides a resin composition containing a thermoplastic resin (A) and a partially dehydrated product or completely dehydrated product (B) of hydrated carboxylic acid salt.

10 Claims, No Drawings

RESIN COMPOSITION, MELT-FORMED ARTICLE, MULTILAYER STRUCTURE, AND PROCESS FOR PRODUCING RESIN COMPOSITION

TECHNICAL FIELD

The present invention relates to a resin composition. More specifically, it relates to a resin composition containing a thermoplastic resin and a partially dehydrated product or completely dehydrated product of hydrated carboxylic acid salt and a multilayer structure having a layer of such a resin composition.

BACKGROUND ART

In general, when a multilayer structure containing a gas-barrier resin layer such as a saponified ethylene-vinyl ester-based copolymer (hereinafter sometimes referred to as EVOH) or a polyamide-based resin is subjected to the retorting (a hot-water treatment), it is known that gas-barrier performance is lowered by penetration of water into the gas-barrier resin layer from an edge or the like of the multilayer structure to destroy intermolecular hydrogen bonds.

Heretofore, against the problem, there has been proposed a technology for suppressing the lowering of the gas-barrier performance by using a resin composition containing a hydrate-forming salt such as monosodium phosphate, sodium pyrophosphate, sodium sulfate, or silica gel blended into an EVOH layer as a desiccant, wherein the desiccant absorbs the water penetrated into the resin composition after the hot-water treatment as crystal water to prevent the destruction of the intermolecular hydrogen bonds (for example, see Patent Document 1).

However, according to the method, the viscosity of the resin composition increases with time in a melt-kneading step at forming and the increased viscosity causes deposition of the resin in an extruder. Also, the viscosity of the deposited resin further increases and thus the resin is still more difficult to be discharged, so that there is a problem that a thermally degraded product of the resin is generated and handling properties of the resin get worse. Moreover, there is a room for improving the gas-barrier properties after the hot-water treatment.

PRIOR ART DOCUMENT

Patent Document

Patent Document 1: JP-A-63-113062 (U.S. Pat. No. 4,792,484)

SUMMARY OF THE INVENTION

Problems that the Invention is to Solve

Thus, an object of the present invention is to provide a resin composition which solves problems of the increase in the viscosity of the resin composition and deterioration of the handling properties in a melt-kneading step at forming and is excellent in gas-barrier properties after the hot-water treatment and also excellent in handling properties.

Means for Solving the Problems

As a result of the extensive studies in consideration of the above situation, the present inventors have found that a resin composition containing a thermoplastic resin (A) and a partially dehydrated product or completely dehydrated product (B) of hydrated carboxylic acid salt suppresses viscosity increase at melt-kneading and is excellent in handling properties as well as a multilayer structure having at least one layer of the resin composition is excellent in gas-barrier properties after a hot-water treatment. Thus, they have accomplished the invention.

Namely, in the invention, preferably, the partially dehydrated product or completely dehydrated product (B) of hydrated carboxylic acid salt is dispersed in the thermoplastic resin (A), and water penetrated into the thermoplastic resin (A) is absorbed as crystal water. Since the partially dehydrated product or completely dehydrated product (B) of hydrated carboxylic acid salt has a good affinity to the thermoplastic resin, it is surmised that it becomes possible to satisfactorily remove the water penetrated into the thermoplastic resin (A) in the hot-water treatment and the like by the partially dehydrated product or completely dehydrated product (B) of hydrated carboxylic acid salt and thus the gas-barrier properties after the hot-water treatment becomes excellent and the viscosity increase with time at melt-kneading is suppressed.

Namely, the following shows a gist of the invention.

(1) A resin composition comprising a thermoplastic resin (A) and a partially dehydrated product or completely dehydrated product (B) of hydrated carboxylic acid salt.

(2) The resin composition according to (1), wherein a ratio of the thermoplastic resin (A) to the partially dehydrated product or completely dehydrated product (B) of hydrated carboxylic acid salt is from 10/90 to 99/1 in terms of weight ratio.

(3) The resin composition according to (1) or (2), wherein a ratio of the thermoplastic resin (A) to the partially dehydrated product or completely dehydrated product (B) of hydrated carboxylic acid salt is from 80/20 to 95/5 in terms of weight ratio.

(4) The resin composition according to any one of (1) to (3), wherein the partially dehydrated product or completely dehydrated product (B) of hydrated carboxylic acid salt is a dehydrated product of hydrated carboxylic acid salt, an amount of crystal water therein being 70% or less relative to a saturated amount thereof.

(5) The resin composition according to any one of (1) to (4), wherein the partially dehydrated product or completely dehydrated product (B) of hydrated carboxylic acid salt is a completely dehydrated product of hydrated carboxylic acid salt.

(6) The resin composition according to any one of (1) to (5), wherein the partially dehydrated product or completely dehydrated product (B) of hydrated carboxylic acid salt is a partially dehydrated product or completely dehydrated product of hydrated carboxylic acid salt having 1 to 12 carbon atoms.

(7) The resin composition according to any one of (1) to (6), wherein the partially dehydrated product or completely dehydrated product (B) of hydrated carboxylic acid salt is a partially dehydrated product or completely dehydrated product of monobasic to tetrabasic hydrated carboxylic acid salt.

(8) The resin composition according to any one of (1) to (7), wherein the thermoplastic resin (A) contains at least one selected from a polyamide-based resin, a polyolefin-based resin, a polyester-based resin, a polystyrene-based resin, and saponified ethylene-vinyl ester-based copolymer.

(9) The resin composition according to any one of (1) to (8), wherein the thermoplastic resin (A) contains saponified ethylene-vinyl ester-based copolymer and a polyamide-based resin and contains the polyamide-based resin in an amount of 1 to 40% by weight relative to the saponified ethylene-vinyl ester-based copolymer.

(10) A melt formed article containing the resin composition according to any one of (1) to (9).

(11) A multilayer structure having at least one layer of the resin composition according to any one of (1) to (10).

(12) A multilayer structure comprising a layer containing saponified ethylene-vinyl ester-based copolymer as an intermediate layer and layers each containing a thermoplastic resin containing at least one selected from a polyamide-based resin, a polyolefin-based resin, a polyester-based resin, and a polystyrene-based resin provided on both sides of the intermediate layer, wherein at least one layer of the layer containing the saponified ethylene-vinyl ester-based copolymer and the layer to be laminated on the layer containing the saponified ethylene-vinyl ester-based copolymer contains a partially dehydrated product or completely dehydrated product (B) of hydrated carboxylic acid salt.

(13) The multilayer structure according to (12), wherein the layer containing the saponified ethylene-vinyl ester-based copolymer further contains the polyamide-based resin in an amount of 1 to 40% by weight relative to the saponified ethylene-vinyl ester-based copolymer.

(14) A process for producing the resin composition according to (1), which comprises melt-mixing the thermoplastic resin (A) with the partially dehydrated product or completely dehydrated product (B) of hydrated carboxylic acid salt.

Advantage of the Invention

There are exhibited advantages that the resin composition of the invention suppresses viscosity increase of the resin composition in a melt-kneading step at forming and exhibits good handling properties, and the multilayer structure having at least one layer of the resin composition of the invention is excellent in gas-barrier properties after a hot-water treatment.

Mode for Carrying Out the Invention

The following will explain the constitution of the present invention in detail but merely show one example of desirable embodiments.

The following will explain the invention in detail.
<Explanation of Thermoplastic Resin (A)>

The thermoplastic resin (A) in the invention is sufficiently a known thermoplastic resin. Specific examples thereof include polyamide-based resins, polyolefin-based resins, polyester-based resins, polystyrene-based resins, saponified ethylene-vinyl ester-based copolymers, polyvinyl chloride-based resins, polycarbonate-based resins, polyacrylic resins, ionomers, ethylene-acrylic acid copolymers, ethylene-acrylic acid ester copolymers, ethylene-methacrylic acid copolymers, ethylene-methacrylic acid ester copolymers, and the like. Of these, preferred are polyamide-based resins, polyolefin-based resins, polyester-based resins, polystyrene-based resins, and saponified ethylene-vinyl ester-based copolymers.

The invention is effective for resins that easily absorb water and thereby change physical properties.

Specific examples of the polyamide-based resins include aliphatic polyamides such as polycapramide (Nylon 6), poly-ω-aminoheptanoic acid (Nylon 7), poly-ω-aminononanoic acid (Nylon 9), polyundecanamide (Nylon 11), polylauryl-lactam (Nylon 12), polyethylenediamineadipamide (nylon 26), polytetramethyleneadipamide (Nylon 46), polyhexamethyleneadipamide (Nylon 66), polyhexamethylenesebacamide (Nylon 610), polyhexamethylenedodecamide (Nylon 612), polyoctamethyleneadipamide (Nylon 86), polydecamethyleneadipamide (Nylon 108), caprolactam/lauryllactam copolymers (Nylon 6/12), a caprolactam/ω-aminononanoic acid copolymer (Nylon 6/9), a caprolactam/hexamethylenediammonium adipate copolymer (Nylon 6/66), a lauryllactam/hexamethylenediammonium adipate copolymer (Nylon 12/66), an ethylenediamineadipamide/hexamethylenediammonium adipate copolymer (Nylon 26/66), a caprolactam/hexamethylenediammonium adipate/hexamethylenediammonium sebacate copolymer (Nylon 66/610), and an ethyleneammonium adipate/hexamethylenediammonium adipate/hexamethylenediammonium sebacate copolymer (Nylon 6/66/610); aromatic polyamides such as polyhexamethyleneisophthalamide, polyhexamethyleneterephthalamide, poly-m-xyleneadipamide, a hexamethyleneisophthalamide/terephthalamide copolymer, poly-p-phenyleneterephthalamide, and poly-p-phenylene.3-4' dipenyletherterephthalamide; amorphous polyamdies; terminal-modified polyamides in which the above polyamide-based resins are modified with a carboxyl group or an amino group such as methylenebenzylamine or m-xylenediamine at the terminal.

The polyolefin-based resins include polyethylene-based resins such as linear low density polyethylene (LLDPE), low density polyethylene (LDPE), very-low density polyethylene (VLDPE), medium density polyethylene (MDPE), and high density polyethylene (HDPE); polypropylene-based resins such as ethylene-propylene (block or random) copolymers, polypropylene, and propylene-α-olefin (α-olefin having 4 to 20 carbon atoms) copolymers; polybutene; polypentene; polymethylpentene; and modified polyolefin-based resins each containing a carboxyl group, which are obtained by chemically combining an unsaturated carboxylic acid or an anhydride thereof to these polyolefin-based resins through an addition reaction, a graft reaction, or the like; ethylene-vinyl acetate-based copolymers; and the like.

The polyester-based resins include polyethylene terephthalate, polytrimethylene terephthalate polybutylene terephthalate, polyethylene naphthalate, polybutylene naphthalate, and the like.

The polystyrene-based resins include polystyrene, modified polystyrene, and the like.

The polyvinyl chloride-based resins include polyvinyl chloride, polyvinylidene chloride, and the like.

The polycarbonate-based resins include polycarbonates, modified polycarbonates, and the like.

The acrylic resins include polyacrylic acid, polymethacrylic acid, and the like.

Of these, since the gas-barrier properties of EVOH are considerably lowered by water, the advantages of the invention are more remarkably obtained.

The following will explain EVOH in detail.

In particular, EVOH is a water-insoluble resin and is a resin obtained by copolymerizing ethylene and a vinyl ester-based monomer, followed by saponification and, generally, there may be mentioned those known as films for food packaging. As such vinyl ester-based monomers, a representative is vinyl acetate. The ethylene-vinyl ester copolymer is produced by a known any polymerization method such as a solution polymerization, a suspension polymerization, or an emulsion polymerization, and the saponification of the resulting ethylene-vinyl ester copolymer can be also performed by a known method.

As the vinyl ester-based copolymer, from the viewpoint of commercial availability and good efficiency in impurity processing at the production, vinyl acetate is representatively used. In addition, examples thereof include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate; aromatic vinyl esters such as vinyl benzoate; and the like. They are aliphatic vinyl esters each having usually 3 to 20 carbon atoms, preferably 4 to 10 carbon atoms, and particularly preferably 4 to 7 carbon atoms. They are usually used singly but a plurality of them may be used simultaneously as needed.

The content of the ethylene structural unit in EVOH is usually from 20 to 60% by mol, preferably from 25 to 50% by mol, and particularly preferably from 29 to 48% by mol as a value measured based on ISO14663. When such content is too low, the gas-barrier properties and melt formability at high humidity tend to decrease. Contrarily, when the content is too high, the gas-barrier properties tend to be insufficient.

The degree of saponification of the vinyl ester component in EVOH is usually from 90 to 100% by mol, preferably from 95 to 100% by mol, and particularly preferably from 99 to 100% by mol as a value measured based on JIS K6726 (however, in a solution in which the resin is homogeneously dissolved in a water/methanol solvent). When such degree of saponification is too low, the gas-barrier properties, thermal stability, humidity resistance, and the like tend to decrease.

Moreover, the melt flow rate (MFR) (210° C., load of 2,160 g) of EVOH is usually from 0.5 to 100 g/10 minutes, preferably from 1 to 50 g/10 minutes, and particularly preferably from 3 to 35 g/10 minutes. When MFR is too large, film formability tends to be unstable. When MFR is too small, the viscosity becomes too large and thus melt extrusion tends to be difficult.

Furthermore, in EVOH in the invention, a polymerizable ethylenically unsaturated monomer may be copolymerized in the range where the advantages of the invention are not inhibited (for example, 10% or less by mol).

Such monomer includes olefins such as propylene, 1-butene, and isobutene; hydroxyl group-containing α-olefins such as 3-buten-1-ol, 3-butene-1,2-diol, 4-penten-1-ol, and 5-hexene-1,2-diol and derivatives such as esterified products and acylated products thereof; unsaturated acids such as acrylic acid, methacrylic acid, crotonic acid, phthalic acid (anhydride), maleic acid (anhydride), and itaconic acid (anhydride) or salts or mono- or di(alklyl having 1 to 18 carbon atoms) esters thereof; acrylamides such as acrylamide, N-(alkyl having 1 to 18 carbon atoms)acrylamide, N,N-dimethylacrylamide, 2-acrylamidopropanesulfonic acid or salts thereof, and acrylamidopropyldimethylamine or acid salts thereof or quaternary ammonium salts thereof; methacrylamides such as methacrylamide, N-(alkyl having 1 to 18 carbon atoms)methacrylamide, N,N-dimethylmethacrylamide, 2-methacrylamidopropanesulfonic acid or salts thereof, and methacrylamidopropyldimethylamine or acid salts thereof or quaternary ammonium salts thereof; N-vinylamides such as N-vinylpyrrolidone, N-vinylformamide, and N-vinylacetamide; cyanidated vinyls such as acrylonitrile and methacrylonitrile; vinyl ethers such as (alkyl having 1 to 18 carbon atoms) vinyl ether, hydroxyalkyl vinyl ether, and alkoxyalkyl vinyl ether; halogenated vinyl compounds such as vinyl chloride, vinylidene chloride, vinyl fluoride, vinylidene fluoride, and vinyl bromide; vinylsilanes such as trimethoxyvinylsilanes; halogenated allyl compounds such as allyl acetate and allyl chloride; allyl alcohols such as allyl alcohol and dimethoxyallyl alcohol; trimethyl-(3-acrylamido-3-dimethylpropyl)-ammonium chloride, acrylamido-2-methylpropanesulfonic acid, and the like.

In particular, EVOH in which hydroxyl group-containing α-olefins is copolymerized is preferred in view of good melt formability and particularly, EVOH having 1,2-diol at a side chain is preferred.

Such EVOH having 1,2-diol at a side chain contains a 1,2-diol structural unit at a side chain. Such a 1,2-diol structural unit is specifically a structural unit represented by the following structural unit (1):

[Chem. 1]

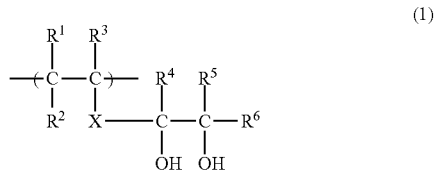

wherein $R^1$, $R^2$, and $R^3$ each independently represents a hydrogen atom or an organic group, X represents a single bond or a bonding chain, and $R^4$, $R^5$, and $R^6$ each independently represents a hydrogen atom or an organic group.

The organic group in the 1,2-diol structural unit represented by the above general formula (1) is not particularly limited and examples thereof include saturated hydrocarbon groups such as a methyl group, an ethyl group, an n-propyl group, an isopropyl group, an n-butyl group, an isobutyl group, and a tert-butyl group; aromatic hydrocarbon groups such as a phenyl group and a benzyl group; halogen atoms, hydroxyl groups, acyloxy groups, alkoxycarbonyl groups, carboxyl groups, sulfonic acid groups; and the like.

$R^1$ to $R^3$ are each preferably a saturated hydrocarbon group having usually 1 to 30 carbon atoms, particularly 1 to 15 carbon atoms, further 1 to 4 carbon atoms or a hydrogen atom, and most preferably a hydrogen atom. $R^4$ to $R^6$ are each preferably an alkyl group having usually 1 to 30 carbon atoms, particularly 1 to 15 carbon atoms, further 1 to 4 carbon atoms or a hydrogen atom and most preferably a hydrogen atom. In particular, those wherein all of $R^1$ to $R^6$ are a hydrogen atom are most preferred.

Moreover, X in the structural unit represented by the general formula (1) is representatively a single bond.

In this regard, X may be a bonding chain in the range where the advantages of the invention are not inhibited. Such a bonding chain is not particularly limited and includes hydrocarbon chains such as alkylene, alkenylene, alkynylene, phenylene, and naphthylene (these hydrocarbons may be substituted with halogen such as fluorine, chlorine, and/or bromine) as well as structures containing an ether bond portion, such as —O—, —(CH$_2$O)$_m$—, —(OCH$_2$)$_m$—, and —(CH$_2$O)$_m$CH$_2$—; structures containing a carbonyl group, such as —CO—, —COCO—, —CO(CH$_2$)$_m$CO—, and —CO(C$_6$H$_4$)CO—; structures containing a sulfur atom, such as —S—, —CS—, —SO—, and —SO$_2$—; structures containing a nitrogen atom, such as —NR—, —CONR—, —NRCO—, —CSNR—, —NRCS—, and —NRNR—; structures containing a heteroatom, including e.g., structures containing a phosphorus atom, such as —HPO$_4$—; structures containing a metal atom, including e.g., structures containing a silicon atom, such as —Si(OR)$_2$—, —OSi(OR)$_2$—, and —OSi(OR)$_2$O—, structures containing a titanium atom, such as —Ti(OR)$_2$—, —OTi(OR)$_2$—, and —OTi(OR)$_2$O—, and structures containing an aluminum atom, such as —Al(OR)—, —OAl(OR)—, and —OAl(OR)O—; and the like. In this regard, R each independently is an arbitrary substituent and is preferably a hydrogen atom or an alkyl group and m is a natural number and is usually from 1 to 30, preferably from 1 to 15, further preferably from 1 to 10. Particularly, in view of stability at production and use, —CH$_2$OCH$_2$— and a hydrocarbon chain having 1 to 10 carbon atoms are preferred and furthermore, a hydrocarbon chain having 1 to 6 carbon atoms, particularly, 1 carbon atom is preferred.

The most preferable structure in the 1,2-diol structural unit represented by the above general formula (1) is one wherein all of R$^1$ to R$^6$ are a hydrogen atom and X is a single bond. Namely a structural unit represented by the following structural unit (1a) is most preferred.

[Chem. 2]

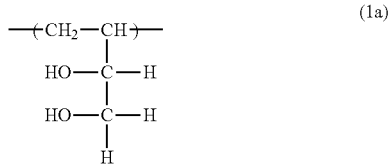

(1a)

Particularly, in the case where EVOH contains the 1,2-diol structural unit represented by the above general formula (1), it is preferred that the content is usually from 0.1 to 20% by mol, further from 0.1 to 15% by mol, and particularly from 0.1 to 10% by mol.

Moreover, EVOH to be used in the invention may be a mixture with other different EVOH. Such other EVOH includes those having a different content of the 1,2-diol structural unit represented by the general formula (1), those having a different degree of saponification, those having a different degree of polymerization, those having a different other copolymerization component, and the like.

The kind of the thermoplastic resin (A) in the invention can be selected depending on intended purpose of use. Depending on the purpose, the above resin may be use singly or two or more thereof may be simultaneously used as a mixture.

On this occasion, particularly in the case where it is used for the purpose of gas-barrier properties, it is preferred to contain EVOH or a polyamide-based resin that is a known gas-barrier resin in an amount of 70% or more relative to the whole resin composition.

Furthermore, in the case where it is used for the purpose of gas-barrier properties and hot water resistance is imparted, it is effective to use a resin composition in which a polyamide-based resin is mixed in an amount of 1 to 40% by weight, preferably 2 to 30% by weight, particularly preferably 3 to 15% by weight relative to EVOH.

<Explanation of Partially Dehydrated Product or Completely Dehydrated Product (B) of Hydrated Carboxylic Acid Salt>

The partially dehydrated product or completely dehydrated product (B) of hydrated carboxylic acid salt means a compound obtained by drying and dehydrating a hydrated carboxylic acid salt. Namely, the product may be a carboxylic acid salt having a nature of incorporating a water molecule as crystal water.

Moreover, the partially dehydrated product or completely dehydrated product (B) of hydrated carboxylic acid salt is usually solid at normal temperature and pressure.

As described above, the partially dehydrated product or completely dehydrated product (B) of hydrated carboxylic acid salt can incorporate crystal water until it reaches a stable state as a saturated hydrate of hydrated carboxylic acid salt. Therefore, the more the amount of the crystal water to be incorporated until the salt becomes such a saturated hydrate is, the more excellent the drying ability is.

The carboxylic acid salt in the partially dehydrated product or completely dehydrated product (B) of hydrated carboxylic acid salt is usually a carboxylic acid salt which can become monohydrate to pentadecahydrate, preferably a carboxylic acid salt which can become dihydrate to pentadecahydrate, and particularly preferably a carboxylic acid salt which can become trihydrate to decahydrate.

Also, the partially dehydrated product or completely dehydrated product (B) of hydrated carboxylic acid salt of the invention may be a dehydrated product of the above hydrated carboxylic acid salt containing crystal water in an amount less than a saturated amount, preferably a dehydrated product of the above hydrated carboxylic acid salt in which an amount of crystal water is from 70 to 0% relative to the saturated amount, and particularly preferably a completely dehydrated product of the hydrated carboxylic acid salt (anhydrous carboxylic acid salt).

The kind of the carboxylic acid salt in the partially dehydrated product or completely dehydrated product (B) of hydrated carboxylic acid salt includes usually aromatic carboxylic acid salts, aliphatic carboxylic acid salts, amino acid salts, and the like. Since it is considered that such aliphatic carboxylic acid salts and amino acid salts are preferably those that do not induce a graft reaction and the like with the thermoplastic resins, the carboxylic acid salt is preferably a saturated aliphatic compound.

The carboxylic acid salt is usually a metal salt or an ammonium salt, preferably a salt of an alkali metal such as sodium or potassium or a metal salt of an alkaline earth metal such as magnesium or calcium, particularly preferably an alkali metal salt, and most preferably a potassium salt or a sodium salt.

The carbon number of the carboxylic acid salt is usually from 1 to 12, preferably from 2 to 10, and particularly preferably from 2 to 6.

Moreover, the valency of the carboxyl ion of the carboxylic acid salt is usually from monovalent to tetravalent, preferably monovalent to trivalent, and particularly preferably monovalent to divalent.

The weight-average molecular weight of the hydrated carboxylic acid salt in the partially dehydrated product or completely dehydrated product (B) of hydrated carboxylic acid salt is usually from 50 to 1000, preferably from 50 to 600, and particularly preferably from 50 to 400.

Specific examples of the hydrated carboxylic acid salt includes acetic acid salts such as sodium acetate (CH$_3$COONa.3H$_2$O) and calcium acetate ((CH$_3$COO)$_2$Ca.H$_2$O), lactic acid salts such as calcium lactate ((CH$_3$CH(OH)COO)$_2$Ca.5H$_2$O), gluconic acid salts such as zinc gluconate ((CH$_2$(OH)CH(OH)CH(OH)CH(OH)CH(OH)COO)$_2$ Zn.3H$_2$O) and calcium gluconate ((CH$_2$(OH)CH(OH)CH(OH)CH(OH)CH(OH)COO)$_2$Ca.H$_2$O), benzoic acid salts such as magnesium benzoate ((C$_6$H$_5$COO)$_2$Mg.4H$_2$O) and calcium benzoate ((C$_6$H$_5$COO)$_2$Ca.3H$_2$O), malic acid salts such as sodium malate ((NaOOCCH(OH)CH$_2$COONa).3H$_2$O) and calcium malate ((OOCCH(OH)CH$_2$COO)Ca.H$_2$O) as monobasic carboxylic acid salts; oxalic acid salts such as potassium oxalate ((COONa)$_2$.H$_2$O) and ammonium oxalate ((COONH$_4$)$_2$.H$_2$O), succinic acid salts such as disodium succinate ((CH$_2$COONa)$_2$.6H$_2$O) and dipotassium succinate ((CH$_2$COOK)$_2$.3H$_2$O), glutamic acid salts such as potassium hydrogen L-glutamate (HOOCCH(NH$_2$)CH$_2$CH$_2$COOK.H$_2$O), sodium hydrogen L-glutamate (HOOCCH(NH$_2$)CH$_2$CH$_2$COONa.H$_2$O), and magnesium L-glutamate ((OOCCH(NH$_2$)CH$_2$CH$_2$COO)Mg.4H$_2$O), aspartic acid salts such as sodium L-aspartate (HOOCCH$_2$CH(COOH)NH$_2$.H$_2$O), tartaric acid salts such as sodium hydrogen L-tartrate (HOOCCH(OH)CH(OH)COONa.H$_2$O) as dibasic carboxylic acid salts; citric acid salts such as tripotassium citrate (KOCOCH$_2$C(OH)(COOK)CH$_2$COOK.H$_2$O) and trisodium citrate ((C$_3$H$_5$O(COO)$_3$)Na$_3$.2H$_2$O) as tribasic carboxylic acid salts; EDTA carboxylic acid salts including EDTA tetraacetic acid salts such as disodium calcium ethylenediaminetetraacetate (Ca(OOCCH$_2$)$_2$NCH$_2$CH$_2$N(CH$_2$COONa)$_2$.2H$_2$O) and disodium ethylenediaminetetraacetate ((HOOCCH$_2$)$_2$NCH$_2$CH$_2$N(CH$_2$COONa)$_2$.2H$_2$O) as tetrabasic carboxylic acid salts; and the like.

In this regard, the above chemical formulae shown in the parentheses represent chemical formulae of hydrates having the largest amount of hydration water.

Among the above, oxalic acid salts, acetic acid salts, propionic acid salts, lactic acid salts, gluconic acid salts, malic acid salts, malonic acid salts, succinic acid salts, citric acid salts, tartaric acid salts, EDTA carboxylic acid salts are aliphatic carboxylic acid salts and glutamic acid salts and aspartic acid salts are amino acid salts.

From the viewpoint of productivity and safety, the carboxylic acid salts are preferably from monobasic to tetrabasic ones and are saturated aliphatic carboxylic acid salts having a weight-average molecular weight of 50 to 600 and amino acid salts, and particularly preferably acetic acid salts, lactic acid salts, gluconic acid salts, malic acid salts, malonic acid salts, succinic acid salts, citric acid salts, tartaric acid salts, glutamic acid salts, and aspartic acid salts.

The partially dehydrated product or completely dehydrated product (B) of hydrated carboxylic acid salt is usually powdery and, with regard to the particle size as a value measured based on ASTM E11-04, the value of 100 mesh pass is 50% by volume or more, preferably the value of 100 mesh pass is 60% by volume or more, and particularly preferably the value of 100 mesh pass is 100% by volume or more. From the viewpoint of good dispersing properties in the thermoplastic resin (A), such a particle size is preferably small. When the particle size is too large, there is a tendency that an effect of removing water penetrated into the thermoplastic resin (A) is insufficient and gas-barrier properties after the hot-water treatment (i.e., the retorting) are insufficient.

These partially dehydrated products or completely dehydrated products (B) of hydrated carboxylic acid salts are usually used singly or two or more thereof can be used as a mixture.

In the invention, the partially dehydrated product or completely dehydrated product (B) of hydrated carboxylic acid salt is preferably dispersed in the thermoplastic resin (A). Therefore, according to the technical idea that a specific compound had been selected, the amount of the partially dehydrated product or completely dehydrated product (B) of hydrated carboxylic acid salt to be blended is not particularly limited, and an effect according to the amount can be exhibited.

In the resin composition of the invention, the ratio of the thermoplastic resin (A) to the partially dehydrated product or completely dehydrated product (B) of hydrated carboxylic acid salt is usually 10/90, preferably 30/70 or more, more preferably more than 50/less than 50, further preferably 70/30 or more, particularly preferably 80/20 or more, and especially preferably 85/15 or more, and usually 99/1 or less, preferably 97/3 or less, more preferably 95/5 or less, and further preferably 92/8 or less in terms of weight ratio. In this regard, the range of the ratio of the thermoplastic resin (A) to the partially dehydrated product or completely dehydrated product (B) of hydrated carboxylic acid salt is preferably from 10/90 to 99/1, more preferably from 30/70 to 97/3, and further preferably from 80/20 to 95/5.

Particularly, the ratio of the thermoplastic resin (A) to the partially dehydrated product or completely dehydrated product (B) of hydrated carboxylic acid salt in a formed article using the resin composition of the invention is usually from more than 50/less than 50 to 99/1, further preferably from 70/30 to 97/3, particularly from 80/20 to 95/5, especially from 85/15 to 92/8 in terms of weight ratio as the completely dehydrated product of carboxylic acid salt. However, in such (B), it means weight in the state of the completely dehydrated product. When such a ratio is too large, there is a tendency that the effect of removing water penetrated into the thermoplastic resin (A) is insufficient and the gas-barrier properties after the hot-water treatment (i.e., the retorting) are insufficient. When the ratio is too small, there is a tendency that the layer of the thermoplastic resin (A) is not formed and the gas-barrier properties are not sufficient.

Incidentally, the resin composition of the invention may be subjected to forming as it is to obtain various formed articles or a high concentration composition (also referred to as a master batch) of the partially dehydrated product or completely dehydrated product (B) of hydrated carboxylic acid salt may be once produced and may be diluted with a thermoplastic resin at forming, thereby obtaining various formed articles. The ratio of the thermoplastic resin (A) to the partially dehydrated product or completely dehydrated product (B) of hydrated carboxylic acid salt in such a master batch is usually from 10/90 to less than 50/more than 50 in terms of weight ratio of the thermoplastic resin (A) to the partially dehydrated product or completely dehydrated product (B) of hydrated carboxylic acid salt.

The resin composition of the invention may be appropriately blended with known additives such as a plasticizer, a filler, a clay (montmorillonite or the like), a blocking inhibitor, an antioxidant, a colorant, an antistatic agent, an oxygen absorbent, a UV absorbent, a lubricant, a wax, and a dispersant (stearic acid monoglyceride, calcium stearate, or the like) which are commonly used in the above thermoplastic resin (A) in the range where the gist of the invention is not inhibited (for example, 30% by weight or less, preferably 10% by weight or less based on the whole resin composition).

Moreover, the resin composition of the invention suppresses viscosity increase of the resin composition in a melt-kneading step at forming and thus the handling properties become satisfactory. The value of the melt viscosity at 230° C. after 120 minutes/the value after 20 minutes is usually from 1.0 to 1.5 and preferably from 1.0 to 1.3. When such a value is too low, there is a concern that voids may occur at film formation. When the value is too high, there is a tendency that a deposited degraded product is prone to be brought about.

<Mixing Method>

At the mixing of the above thermoplastic resin (A) and the partially dehydrated product or completely dehydrated product (B) of hydrated carboxylic acid salt, a melt-kneading method or a mechanical mixing method (pellet dry blending) is usually performed and the melt kneading method is preferred. Specifically, there may be mentioned a method of melt-mixing individual components after dry blending or a method of mixing the thermoplastic resin (A) in a melted state with the partially dehydrated product or completely dehydrated product (B) of hydrated carboxylic acid salt.

As a mixing order, there may be (1) a method of blending (A) and (B) simultaneously and (2) a method of blending (A) with an excess amount of (B) to produce a high concentration composition of (B) and diluting the (B) component with adding (A) to the high concentration composition of (B) to form an objective composition.

Particularly, in the case where two kinds of thermoplastic resins (A1) and (A2) are used as the thermoplastic resin (A), there may be (3) a method of blending either (A1) or (A2) with (B) beforehand and then blending the resulting blend with the other resin and (4) a method of blending (A1) and/or (A2) with an excess amount of (B) beforehand to produce a high concentration composition of (B) and adding (A1) and/or (A2) to the high concentration composition of (B) and blending them to dilute the (B) component.

The method of (1) is usually used but, from the viewpoint of costs during distribution, it is also preferred to produce a high concentration composition of (B) once and to use it with dilution at forming as in the cases of the methods (2) and (4). On this occasion, the ratio of the thermoplastic resin (A) to the high concentration composition of (B) depends on the composition of the high concentration composition of (B) but is usually from 10/90 to 90/10, preferably from 20/80 to 90/10, and particularly preferably from 30/70 to 90/10 in terms of the weight ratio of the thermoplastic resin (A)/the high concentration composition of (B).

With regard to the mixing method, for example, any blending methods such as a method of dry blending in Banbury mixer or the like and a method of melt-kneading in a single screw or twin screw extruder or the like and performing pelletization may be adopted. The temperature for such melt-kneading is usually from 150 to 300° C. and preferably from 170 to 250° C.

Optionally, a method of production by immersing (A) and/or the other thermoplastic resin in an aqueous solution of (B) to incorporate (B) and drying can be adopted.

Since (B) in the invention should have hydrate-forming ability in a formed article obtained by forming the resin composition, the method of immersing (A) and/or the other thermoplastic resin in an aqueous solution of (B) to incorporate (B) and subsequently drying is difficult to adopt owing to the tendency of lowering the hydrate-forming ability of (B).

Moreover, depending on the situation, it is also possible to adopt a method of obtaining the resin composition of the invention through vaporization of the hydration water contained in the saturated hydrate of the carboxylic acid salt by mixing and melt-kneading the thermoplastic resin (A) such as EVOH and the saturated hydrate of the carboxylic acid salt. However, since there is a tendency that voids may be generated in the resin composition in such a method, it is difficult to adopt the method.

The resin composition of the invention can be, for example, formed into formed articles such as films, sheets, cups, and bottles by melt-forming. As such a melt-forming method, an extrusion method (T type die extrusion, inflation extrusion, blow molding, melt-spinning, profile extrusion, etc.) or an injection molding method is mainly adopted. The temperature for melt-forming is frequently selected from the range of usually 150 to 300° C., preferably 170 to 250° C.

The melt formed article containing the resin composition of the invention may be used in various application uses as it is. On this occasion, the thickness of layer of the resin composition is usually from 20 to 5000 µm, preferably from 40 to 4000 µm, and particularly preferably from 60 to 3000 µm or more.

In this regard, the layer of the resin composition usually contains the thermoplastic resin (A) and the partially dehydrated product or completely dehydrated product (B) of hydrated carboxylic acid salt. Also, the layer of the resin composition is a layer formed from the resin composition obtained as above and is usually obtained by performing the melt-forming as above. In the resin composition of the invention, the thermoplastic resin (A) and the partially dehydrated product or completely dehydrated product (B) of hydrated carboxylic acid salt do not react with each other by the heat at melting. Usually, in the melt formed article obtained by forming the resin composition of the invention, the partially dehydrated product or completely dehydrated product (B) of hydrated carboxylic acid salt is present in a dispersed state in the matrix of the thermoplastic resin (A).

<Explanation of Multilayer Structure Having Layer of Resin Composition of the Invention>

In order to further increase the strength and/or to impart other function(s), the resin composition of the invention may be formed into a multilayer structure by laminating the resin composition with other base material containing no partially dehydrated product or completely dehydrated product (B) of hydrated carboxylic acid salt. As the other base material, a thermoplastic resin the same as the resin mentioned as the thermoplastic resin (A) described above is useful. Usually, in order to further increase the strength and/or to impart other function(s), other thermoplastic resin different in kind from the thermoplastic resin (A) is used.

The other thermoplastic resin to be used as the above other base material may contain known additives such as a plasticizer, a filler, a clay (montmorillonite or the like), a blocking inhibitor, an antioxidant, a colorant, an antistatic agent, an oxygen absorbent, a UV absorbent, a lubricant, a wax, and a dispersant which are hitherto known, in the range where the gist of the invention is not inhibited (for example, 30% by weight or less, preferably 10% by weight or less).

As a lamination method for laminating the resin composition of the invention with the resin composition of the invention using the thermoplastic resin (A) different in kind and/or the other thermoplastic resin, the lamination can be performed by a known method. For example, there may be mentioned a method of melt-extrusion lamination of other base material onto a film, a sheet, or the like of the resin composition of the invention, a method of melt-extrusion lamination of the resin onto the other base material inversely, a method of co-extrusion of the resin together with the other base material, a method of dry lamination of the resin (layer) with the other base material (layer) using a known adhesive such as an organotitanium compound, an isocyanate compound, a polyester-based compound, or a polyurethane compound, a method of coating the other base material with a solution of the resin and subsequently removing the solvent, and the like.

Of these, in consideration from the viewpoint of costs and the environment, the method of co-extrusion is preferred.

In the multilayer structure of the invention, the resin composition of the invention can be used in each layer contained in the multilayer structure. On this occasion, the layer of the resin composition of the invention may be present at any position of outermost layer, intermediate layer, and innermost layer of the multilayer structure.

For example, when the layers of the resin compositions of the invention are referred to as a1 (a polyolefin-based resin is used as (A)), a2 (a polyamide-based resin is used as (A)), a3 (a polyester-based resin is used as (A)), and a4 (EVOH is used as (A)), any combinations such as a1/a2, a1/a4, a1/a2/a1, a1/a4/a1, a3/a2/a3, a3/a4/a3, and a2/a4/a2 are possible.

Moreover, when the layers of the resin compositions of the invention are referred to as α (α1, α2, . . . ) and the layers of the other thermoplastic resins (i.e., thermoplastic resins containing no (B) component) are referred to as β (β1, β2, . . . ), not only a bilayer structure of α/β but also any combinations such as β/α/β, α/β/α, α1/α2/β, α/β1/β2, β/α1/α2/α1/β, β2/β1/α/β1/β2, and β2/β1/α/β1/β2 are possible. In addition, when a recycle layer containing a mixture of the resin composition and the other thermoplastic resin, which is obtained by re-melt-forming of edge parts and defective products generated in the progress of producing the multilayer structure, is referred to as R, it is also possible to form β/R/α, β/R/α/β, β/R/α/R/β, β/a/R/α/β, β/R/α/R/α/R/β, and the like.

In the above layer constitution, an adhesive resin layer may be provided between individual layers as needed. As such an adhesive resin, known one may be used. Since the adhesive resin varies depending on the kinds of the resins a and α and β, the adhesive resin may be appropriately selected but, among the thermoplastic resins (A), representatively, a modified polyolefin-based resin containing a carboxyl group, which is obtained by chemically combining an unsaturated carboxylic acid or an anhydride thereof with a polyolefin-based resin through an addition reaction or a graft reaction, may be mentioned. Specific examples are modified polyethylene grafted with maleic anhydride, modified polypropylene grafted with maleic anhydride, modified ethylene-propylene (block and random) copolymers grafted with maleic anhydride, modified ethylene-ethyl acrylate copolymers grafted with maleic anhydride, modified ethylene-vinyl acetate copolymers grafted with maleic anhydride, and the like, and one kind or a mixture of two or more kinds selected from them is preferred. In addition, it is possible to blend these adhesive resins with a rubber/elastomer component such as polyisobutylene or ethylene-propylene rubber and further a resin of the β layer and the like. Particularly, it is also useful to blend the adhesive resin with a polyolefin-based resin different from the polyolefin-based resin that is a mother resin of the adhesive resin.

In particular, when gas-barrier properties are imparted to the multilayer structure, it is useful to provide a layer of a gas-barrier resin such as EVOH or a polyamide-based resin. However, since EVOH and a polyamide-based resin exhibits lowered gas-barrier properties when water penetrates into the resin, generally, a hydrophobic thermoplastic resin (hereinafter sometimes referred to as other hydrophobic resin and examples thereof include polyolefin-based resins, polyester-based resins, polystyrene-based resins, and the like. Incidentally, since a polyamide-based resin is excellent in impact resistance, it is possible to use the resin as the hydrophobic resin without intending to impart the gas-barrier properties) is laminated in addition to the gas-barrier resin, and they are used as a multilayer structure.

In such a multilayer structure, the technology of the invention may be applied to EVOH, the polyamide-based resins, and the like to be used as the gas-barrier resins or the use of the resin composition of the invention in the other hydrophobic resins to be laminated (e.g., polyamide-based resins, polyolefin-based resins, polyester-based resins, polystyrene-based resins, and the like) and the adhesive resins (e.g., modified polyolefin-based resins and the like) is also useful in view of preventing the penetration of water into the gas-barrier resins. As a matter of course, the technology of the invention may be applied to all individual gas-barrier resins and other hydrophobic resins to be laminated.

Particularly, in the case of performing a hot-water treatment such as the retorting, since water permeates not only from the edge of the multilayer structure but also into the other hydrophobic resin layer slightly and penetrates into the gas-barrier resin layer passing through the other hydrophobic resin layer, it is useful to use the resin composition of the invention in the gas-barrier resin layer and/or individual layers to be laminated on the gas-barrier resin layer.

From such a viewpoint, it is more preferred to use the resin composition of the invention in a layer near to the gas-barrier resin layer, preferably a layer coming in contact with the gas-barrier resin layer.

Specifically, for example, in the case that the other hydrophobic resin (e.g., a polyamide-based resin, a polyolefin-based resin, a polyester-based resin, a polystyrene-based resin, or the like) layer is referred to as a (I) layer, an adhesive resin (e.g., a modified polyolefin-based resin or the like) as a (II) layer, and a gas-barrier resin (e.g., EVOH, a polyamide-based resin, or the like) as a (III) layer and a layer constitution of (I) layer/(II) layer/(III) layer/(II) layer/(I) layer is formed, it is preferred to use the resin composition of the invention in the (III) layer.

Furthermore, in order to further prevent the penetration of water into the (III) layer that is sensitive to the influence of water, it is more preferred to use the resin composition of the invention in the (III) layer and the (II) layer coming in direct contact with the layer.

In the invention, in the multilayer structure containing a layer containing EVOH as an intermediate layer and having a thermoplastic resin layer selected from polyamide-based reins, polyolefin-based resins, polyester-based resins, and polystyrene-based resins provided on both sides of the intermediate layer, it is most preferred to contain the partially dehydrated product or completely dehydrated product (B) of hydrated carboxylic acid salt in a layer containing EVOH and/or a layer to be laminated with the layer containing EVOH.

The multilayer structure of the invention obtained as above is then subjected to a thermal stretching as needed. Such thermal stretching means an operation of forming a thermally homogeneously heated film or sheet-shape multilayer structure into a tube or film shape uniformly by chucking, plugging, vacuum force, pneumatic force, blowing, or the like. Such stretching may be either uniaxial stretching or biaxial stretching and, in the case of the biaxial stretching, it may be simultaneous stretching or sequential stretching.

As the stretching method, a method of high stretching magnification can be also adopted among roll stretching, tenter stretching, tubular stretching, a stretch-blowing method, vacuum pneumatic forming, and the like. In the case of the biaxial stretching, both methods of a simultaneous biaxial stretching method and a sequential biaxial stretching method can be adopted. The stretching temperature is selected from the range of usually 40 to 170° C., preferably about 60 to 160° C. as a temperature near to the multilayer structure. When the stretching temperature is too low, stretching ability becomes poor. When the temperature is too high, it becomes difficult to maintain a stable stretched state.

In this regard, for the purpose of imparting dimensional stability after stretching, thermal fixing may be subsequently performed. The thermal fixing is a well-known method and is practicable. For example, the above stretched film is subjected to a heat treatment usually at 80 to 180° C., preferably at 100 to 165° C. usually for 2 to 600 seconds while a stressed state is maintained.

Moreover, in the case where a multilayer stretched film obtained from the resin composition of the invention is used as a shrinking film, in order to impart thermal shrinkability, for example, the film after stretching may be subjected to a treatment such as cooling and fixing by blowing the film with cold air without performing the above thermal fixing.

The total thickness of the multilayer structure of the invention is usually from 200 to 50,000 μm, preferably from 400 to 40,000 μm, and particularly preferably from 600 to 30,000 μm.

The layer of the resin composition of the invention in the multilayer structure varies depending on the objective use applications, the kind of the resin, and the layer constitution, but is usually from 20 to 5,000 μm, preferably from 40 to 4,000 μm, and particularly preferably from 60 to 3,000 μm.

Particularly, in the case where the other hydrophobic resin layer and the adhesive resin layer are provided in the multilayer structure using the gas-barrier resin layer, the thickness of each layer thereof may be adjusted depending on the layer constitution, the gas-barrier resin, the kind of the other hydrophobic resin, the kind of the adhesive resin, use applications and packaging forms, required physical properties, and the like.

In such a case, the thickness of the gas-barrier resin layer is usually from 5 to 500 μm, preferably from 10 to 250 μm, and particularly preferably from 20 to 100 μm. In this regard, when two or more gas-barrier resin layers are present, the thickness means thickness of each layer. When the thickness is too small, there is a tendency that sufficient gas-barrier properties are not obtained. On the other hand, when the thickness is too large, flexibility of the film tends to be insufficient.

Moreover, similarly in such a case, the thickness of the other hydrophobic resin layer is usually from 10 to 1000 μm and preferably from 50 to 500 μm, and the thickness of the adhesive resin layer is selected from the range of 5 to 500 μm, preferably from 10 to 250 μm. In this regard, when two or more hydrophobic resin layers are present, the thickness means thickness of each layer.

The thickness ratio of the other hydrophobic resin layer to the layer of the resin composition is usually from more than 1 to 30 and preferably from 2 to 30, as a ratio of the thickest layer to the thickest layer when two or more layers are present as each kind of layers, and the thickness ratio of the adhesive resin layer to the gas-barrier resin layer is usually from 0.1 to 2 and preferably from 0.1 to 1.

It is possible to coat the resulting multilayer structure with other base material by extrusion coating or to laminate the multilayer structure with a film or sheet of the other base material using an adhesive. As such a base material, the other hydrophobic resins described above may be usually used but, in addition, any base materials (paper, metal foils, uniaxially or biaxially stretch plastic films or sheets, and inorganic compound-deposited materials, woven fabrics, nonwoven fabrics, metal flocculates, wood, etc.) can be used.

The multilayer structure obtained as above is useful as various packaging material containers for seasonings such as mayonnaise and dressing, fermented foods such as soybean paste, fat and oil foods such as salad oil, beverages, cosmetics, medicaments, and the like in addition to common foods, as bags including films, sheets and stretched films and containers and cap materials including cups, trays, and bottles.

Particularly, since the multilayer structure having at least one layer of the resin composition of the invention is excellent in the barrier properties after a hot-water treatment, the multilayer structure is particularly useful as a packaging material for foods to be subjected to a hot-water treatment.

Incidentally, in the resin composition of the invention after the hot-water treatment of the multilayer structure, the partially dehydrated product or completely dehydrated product (B) of hydrated carboxylic acid salt absorbs water in the thermoplastic resin (A) such as EVOH with time and the (B) component after the absorption of water is usually present as a hydrated carboxylic acid salt having hydration water in an amount of 70% or more relative to a saturated amount thereof.

EXAMPLES

The following will explain the present invention further in detail with reference to Examples but the invention is not limited to the following Examples unless it exceeds the gist thereof.

Incidentally, in the examples, "part(s)" and "%" mean weight basis ones unless otherwise stated.

Example 1

As a thermoplastic resin (A), 90 parts of EVOH (a saponified ethylene-vinyl acetate copolymer: content of ethylene structural unit of 29% by mol, degree of saponification of 99.7%, MFR of 4 g/10 minutes (210° C., load of 2160 g)) was added to a twin screw extruder having a diameter of 30 mm and possessing two mixing zones. Then, 10 parts of disodium succinate (completely dehydrated product) as a partially dehydrated product or completely dehydrated product (B) of hydrated carboxylic acid salt (EVOH/partially dehydrated product or completely dehydrated product (B) of hydrated carboxylic acid salt=90/10) was side-added through a powder feeder and the whole was melt-kneaded and extruded into a strand shape, which was cut with a cutter to obtain cylindrical pellets of the resin composition of the invention.

Set temperature of extruder: C1/C2/C3/C4/C5/C6/C7/H/D=200/210/230/230/230/230/230/230/230° C.

Then, the pellets were fed to an extruder possessing a T type die and the die was heated to 230° C. to form a three-kind five-layer multilayer film having a thickness of 320 μm. Forming conditions for extrusion were set as follows.

Co-extrusion was carried out using a co-extrusion multilayer film-forming apparatus having three extruders and having a three-kind five-layer type feeding block, a die for multilayer film forming, and a chill roll, and cooling was performed by the chill roll in which cooling water was circulated to obtain a multilayer structure (polypropylene (Japan Polypropylene Corporation "EA6A")/adhesive resin (manufactured by Mitsubishi Chemical Corporation, "MODIC-AP P604V")/resin composition of the invention/adhesive resin/polypropylene (thickness (μm): 120/20/40/20/120)).

<Evaluation of Oxygen Permeability After Hot-Water Treatment>

After a sample piece (10 cm×10 cm) of the above multilayer structure was subjected to a hot-water treatment at 123° C. for 33 minutes using a retorting apparatus (Hisaka Works, Ltd.), the piece was taken out and an oxygen permeation rate (23° C., inside 100% RH, outside 50% RH) was measured using an oxygen gas permeation measuring apparatus (manufactured by MOCON Inc., OX-TRAN 10/50). The results are shown in Table 1.

<Extrusion Properties>

Evaluation of extrusion properties was performed on the resulting resin composition pellets by the following procedure. A change of torque values with time during melt-kneading was measured as follows using a torque detection type rheometer.

Using a torque detection type rheometer ("Plasti-Coder PLE331" manufactured by Brabender Gmbh & Co. KG, roller mixer: W50E) set at a temperature of 230° C., after 55 g of the resin composition pellets was added, they are preheated for 5 minutes and subsequently, torque values were measured with time during melt-kneading at a rotation number of 50 rpm and evaluation was performed as follows. The results are shown in Table 2.

Example 2

A laminate was obtained in the same manner as in Example 1 except that sodium tartrate (completely dehydrated product) was used instead of disodium succinate as a partially dehydrated product or completely dehydrated product (B) of hydrated carboxylic acid salt, and the same evaluation was performed.

Example 3

A laminate was obtained in the same manner as in Example 1 except that trisodium citrate (completely dehydrated product) was used instead of disodium succinate as a partially dehydrated product or completely dehydrated product (B) of hydrated carboxylic acid salt, and the same evaluation was performed.

Comparative Example 1

A laminate was obtained in the same manner as in Example 1 except that sodium pyrophosphate (completely dehydrated product) was blended instead of disodium succinate as a partially dehydrated product or completely dehydrated product (B) of hydrated carboxylic acid salt, and the same evaluation was performed.

Comparative Example 2

A laminate was obtained in the same manner as in Example 1 except that sodium sulfate (completely dehydrated product) was blended instead of disodium succinate as a partially dehydrated product or completely dehydrated product (B) of hydrated carboxylic acid salt, and the evaluation of <Evaluation of Oxygen Permeability after Hot-Water Treatment> was performed.

Comparative Example 3

A laminate was obtained in the same manner as in Example 1 except that silica gel was blended instead of disodium succinate as a partially dehydrated product or completely dehydrated product (B) of hydrated carboxylic acid salt, and the evaluation of <Evaluation of Oxygen Permeability after Hot-Water Treatment> was performed.

Reference Example 1

A laminate was obtained in the same manner as in Example 1 except that no partially dehydrated product or completely dehydrated product (B) of hydrated carboxylic acid salt was blended, and the same evaluation was performed.

TABLE 1

| | Kind of partially dehydrated product or completely dehydrated product (B) of hydrated carboxylic acid salt | Oxygen permeation amount after hot-water treatment $cc/m^2 \cdot day \cdot atm$ | | | |
|---|---|---|---|---|---|
| | | After 5 h | After 12 h | After 1 day | After 3 days |
| Example 1 | Disodium succinate (completely dehydrated product) | 1 | 2 | 2 | 2 |
| Example 2 | Sodium tartrate (completely dehydrated product) | 3 | 3 | 2 | 2 |
| Example 3 | Trisodium citrate (completely dehydrated product) | 4 | 4 | 4 | 3 |
| Comparative Example 1 | Sodium pyrophosphate (completely dehydrated product) | 5 | 5 | 4 | 4 |

TABLE 1-continued

| | Kind of partially dehydrated product or completely dehydrated product (B) of hydrated carboxylic acid salt | Oxygen permeation amount after hot-water treatment $cc/m^2 \cdot day \cdot atm$ | | | |
|---|---|---|---|---|---|
| | | After 5 h | After 12 h | After 1 day | After 3 days |
| Comparative Example 2 | Sodium sulfate (completely dehydrated product) | 16 | 16 | 15 | 12 |
| Comparative Example 3 | Silica gel | 24 | 25 | 24 | 21 |
| Reference Example 1 | — | — | — | 20 | 18 | 16 |

From the above results, in Example 1 of the invention using disodium succinate (completely dehydrated product), the oxygen permeation amount was in such a good state as 2 $cc/m^2 \cdot day \cdot atm$ at the time point when 12 hours had passed after the hot-water treatment and the same good value was observed even after 3 days had passed. Also, in Example 2 of the invention using sodium tartrate (completely dehydrated product) and Example 3 of the invention using trisodium citrate (completely dehydrated product), the oxygen permeation amounts when 3 days had passed after the hot-water treatment were such good values as 2 $cc/m^2 \cdot day \cdot atm$ and 3 $cc/m^2 \cdot day \cdot atm$, respectively.

On the other hand, in Comparative Example 1 using sodium pyrophosphate (completely dehydrated product), the oxygen permeation amount was 5 $cc/m^2 \cdot day \cdot atm$ that is twice or more the oxygen permeation amount in Example 1 at the time point when 12 hours had passed after the hot-water treatment and the oxygen permeation amount was 4 $cc/m^2 \cdot day \cdot atm$ that is twice the oxygen permeation amount in Example 1 even at the time point when 3 days had passed. From such results, superiority of the invention is apparent.

Moreover, in Comparative Example 2, the oxygen permeation amount was 16 $cc/m^2 \cdot day \cdot atm$ that is 8 times or more the oxygen permeation amount in Example 1 at the time point when 12 hours had passed after the hot-water treatment and, in Comparative Example 3, the oxygen permeation amount was 25 $cc/m^2 \cdot day \cdot atm$ that is 12 times or more the oxygen permeation amount in Example 1. Furthermore, at the time point after 3 days, in Comparative Example 2, the oxygen permeation amount was 12 $cc/m^2 \cdot day \cdot atm$ that is still 6 times the oxygen permeation amount in Example 1 and, in Comparative Example 3, the oxygen permeation amount was 21 $cc/m^2 \cdot day \cdot atm$ that is 10 times or more the oxygen permeation amount in Example 1.

From the above results, it can be said that the gas-barrier performance of the resin composition of the invention after the hot-water treatment is a remarkably excellent advantage.

TABLE 2

| | Kind of partially dehydrated product or completely dehydrated product (B) of hydrated carboxylic acid salt | Melt viscosity behavior (Nm) | | | |
|---|---|---|---|---|---|
| | | After 20 minutes | After 80 minutes | After 100 minutes | After 120 minutes |
| Example 1 | Disodium succinate (completely dehydrated product) | 12.4 | 11.4 | 11.5 | 11.9 |
| Example 2 | Sodium tartrate (completely dehydrated product) | 10.5 | 12.1 | 13.5 | 15.7 |
| Example 3 | Trisodium citrate (completely dehydrated product) | 9.8 | 8.2 | 9.5 | 10.5 |

TABLE 2-continued

| | Kind of partially dehydrated product or completely dehydrated product (B) of hydrated carboxylic acid salt | Melt viscosity behavior (Nm) | | | |
|---|---|---|---|---|---|
| | | After 20 minutes | After 80 minutes | After 100 minutes | After 120 minutes |
| Comparative Example 1 | Sodium pyrophosphate (completely dehydrated product) | 10.2 | 13.6 | 16.3 | 18.5 |
| Reference Example 1 | — | 10.7 | 9.7 | 10.3 | 11.3 |

First, it is found that EVOH containing no partially dehydrated product or completely dehydrated product (B) of hydrated carboxylic acid salt has a melt viscosity of 10.7 Nm after 20 minutes but the viscosity increases with time to 11.3 Nm after 120 minutes and thus the viscosity has increased by 1.1 times as compared with the viscosity after 20 minutes (see Reference example).

Moreover, in Comparative Example 1 using sodium pyrophosphate (completely dehydrated product), the viscosity was 10.2 Nm after 20 minutes that was a good value as the case of the present invention. Then, the viscosity increased to 13.6 Nm after 80 minutes and, after 120 minute, the viscosity increased to 18.5 Nm, i.e., to a value 1.8 times the viscosity after 20 minutes.

On the other hand, in Example 1 using disodium succinate (completely dehydrated product), the viscosity was such a good state as 12.4 Nm after 20 minutes. Further, similar values were maintained even after 80 minutes and 100 minutes and the ratio of the value after 120 minutes/the value after 20 minutes in melt viscosity (Nm) at 230° C. was 1.0. Also, in Example 2 using sodium tartrate (completely dehydrated product), the ratio of the value after 120 minutes/the value after 20 minutes in melt viscosity (Nm) at 230° C. was 1.5 and, in Example 3 using trisodium citrate (completely dehydrated product), the ratio of the value after 120 minutes/the value after 20 minutes in melt viscosity (Nm) at 230° C. was 1.1. Thus, the viscosity showed suppressed good values.

From these results, it was found that the resin composition of the invention exhibits a remarkable suppressing effect on viscosity increase with time as compared with the conventional technologies. Therefore, the superiority of the invention is apparent.

Example 4

A laminate was obtained in the same manner as in Example 1 except that a side-chain 1,2-diol-modified EVOH (a saponified product of side-chain 1,2-diol-modified ethylene-vinyl acetate copolymer: content of ethylene structural unit of 32% by mol, content of side-chain 1,2-diol structural unit shown above unit (1a) of 1.0% by mol, degree of saponification of 99.7%, MFR of 4 g/10 minutes (210° C., load of 2160 g)) was used as a thermoplastic resin (A), and the evaluation of <Evaluation of Oxygen Permeability after Hot-Water Treatment> was performed. The results are shown in Table 3.

Example 5

A laminate was obtained in the same manner as in Example 1 except that a polyamide-based resin (6 Nylon: manufactured by Mitsubishi Engineering-Plastics Corporation: Novamid 1022BLMJ) (viscosity number of 195 ml/g (measurement method: JIS K-6933)) was used as a thermoplastic resin (A), and the evaluation of <Evaluation of Oxygen Permeability after Hot-Water Treatment> was performed. The results are shown in Table 3.

Example 6

A laminate was obtained in the same manner as in Example 1 except that a resin composition of the invention was obtained using a polyolefin-based resin (polypropylene: manufactured by Japan Polypropylene Corporation: EA7A) (MFR of 1.4 g/10 minutes (measurement method: JIS K7210)) as a thermoplastic resin (A) and a multilayer structure (resin composition of the invention/adhesive resin ("MODIC-AP P604V" manufactured by Mitsubishi Chemical Corporation)/EVOH (content of ethylene structural unit of 29% by mol, degree of saponification of 99.7%, MFR of 4 g/10 minutes (210° C., load of 2160 g))/adhesive resin/resin composition of the invention (thickness (μm): 120/20/40/20/120)) was obtained, and the evaluation of <Evaluation of Oxygen Permeability after Hot-Water Treatment> was performed. The results are shown in Table 3.

Reference Example 2

A laminate was obtained in the same manner as in Example 4 except that no partially dehydrated product or completely dehydrated product (B) of hydrated carboxylic acid salt was blended, and the evaluation of <Evaluation of Oxygen Permeability after Hot-Water Treatment> was performed. The results are shown in Table 3.

Reference Example 3

A laminate was obtained in the same manner as in Example 5 except that no partially dehydrated product or completely dehydrated product (B) of hydrated carboxylic acid salt was blended, and the evaluation of <Evaluation of Oxygen Permeability after Hot-Water Treatment> was performed. The results are shown in Table 3.

Reference Example 4

A laminate was obtained in the same manner as in Example 6 except that no partially dehydrated product or completely dehydrated product (B) of hydrated carboxylic acid salt was not blended, and the evaluation of <Evaluation of Oxygen Permeability after Hot-Water Treatment> was performed. The results are shown in Table 3.

TABLE 3

| | Thermoplastic resin (A) | Kind of partially dehydrated product or completely dehydrated product (B) of hydrated carboxylic acid salt | Oxygen permeation amount after hot-water treatment cc/m² · day · atm | | | |
|---|---|---|---|---|---|---|
| | | | After 3 days | After 6 days | After 9 days | After 12 days |
| Example 4 | 1,2-Diol-modified EVOH | Disodium succinate (completely dehydrated product) | 4 | 4 | 4 | 4 |
| Example 5 | Polyamide-based resin | Disodium succinate (completely dehydrated product) | 26 | 24 | 24 | 24 |
| Example 6 | Polyolefin-based resin | Disodium succinate (completely dehydrated product) | 2 | 2 | 1 | 1 |
| Reference Example 2 | 1,2-Diol-modified EVOH | — | — | — | — | 44 |
| Reference example 3 | Polyamide-based resin | — | 41 | 33 | 26 | 25 |
| Reference example 4 | Polyolefin-based resin | — | 36 | 25 | 17 | 13 |

From the above results, it was found that the advantages of the invention are effectively obtained also in gas-barrier resins such as modified EVOH and polyamide-based resins. Also, it was found that the advantages of the invention are effectively obtained even when the technology of the invention is applied to the polyolefin-based resin layer used as a hydrophobic resin layer without applying the technology of the invention to the gas-barrier resin.

Example 7

A laminate was obtained in the same manner as in Example 1 except that there was used a resin composition in which EVOH (a saponified ethylene-vinyl acetate copolymer: content of ethylene structural unit of 29% by mol, degree of saponification of 99.7%, MFR of 5 g/10 minutes (210° C., load of 2160 g)) and a polyamide-based resin (6 Nylon: manufactured by Mitsubishi Engineering-Plastics Corporation: Novamid 1022BLMJ) (viscosity number of 195 ml/g (measurement method: JIS K-6933)) as thermoplastic resins (A) were blended in a ratio of EVOH/polyamide-based resin of 90/10 as a weight ratio and magnesium acetate tetrahydrate was contained in an amount of 360 ppm, and the evaluation of <Evaluation of Oxygen Permeability after Hot-Water Treatment> was performed. The results are shown in Table 4.

TABLE 4

| | Thermoplastic resin (A) | Kind of partially dehydrated product or completely dehydrated product (B) of hydrated carboxylic acid salt | Oxygen permeation amount after hot-water treatment cc/m² · day · atm | | | |
|---|---|---|---|---|---|---|
| | | | After 3 days | After 6 days | After 9 days | After 12 days |
| Example 7 | EVOH/polyamide-based resin = 90/10 Resin composition | Disodium succinate (completely dehydrated product) | 3 | 3 | 3 | 3 |

From the above results, it was found that the advantages of the invention are satisfactorily obtained in the resin composition of EVOH and the polyamide-based resin.

Example 8

Evaluation of extrusion properties was performed on pellets of the resin composition obtained in the same manner as in Example 1 except that there was used a resin composition in which EVOH (a saponified ethylene-vinyl acetate copolymer: content of ethylene structural unit of 29% by mol, saponification degree of 99.7%, MFR of 4 g/10 minutes (210° C., load of 2160 g)) and a polyamide-based resin (6 Nylon: manufactured by Mitsubishi Engineering-Plastics Corporation: Novamid 1022BLMJ) (viscosity number of 195 ml/g (measurement method: JIS K-6933)) as thermoplastic resins (A) were blended in a ratio of EVOH/polyamide-based resin of 90/10 as a weight ratio. The results are shown in Table 5.

TABLE 5

| | Thermoplastic resin (A) | Kind of partially dehydrated product or completely dehydrated product (B) of hydrated carboxylic acid salt | Melt viscosity behavior (Nm) | | | |
|---|---|---|---|---|---|---|
| | | | After 20 minutes | After 80 minutes | After 100 minutes | After 120 minutes |
| Example 8 | EVOH/ polyamide-based resin = 90/10 Resin composition | Disodium succinate (completely dehydrated product) | 14.0 | 17.1 | 17.5 | 18.2 |

From the above results, since the ratio of the value after 120 minutes/the value after 20 minutes in melt viscosity (Nm) at 230° C. was 1.3 in the resin composition of EVOH and the polyamide-based resin, it was found that the advantages of the invention are satisfactorily obtained even in the resin composition of EVOH and the polyamide-based resin.

While the invention has been described in detail and with reference to specific embodiments thereof, it will be apparent to one skilled in the art that various changes and modifications can be made therein without departing from the spirit and scope thereof.

The present application is based on Japanese Patent Application No. 2008-205122 filed on Aug. 8, 2008, and the contents are incorporated herein by reference.

INDUSTRIAL APPLICABILITY

Since the resin composition of the invention suppresses viscosity increase in a melt-kneading step at forming and is excellent in handling properties and a multilayer structure having at least one layer of the resin composition of the invention has a property of excellence in gas-barrier properties after a hot-water treatment, the multilayer structure is useful as packaging materials for foods, medicaments, industrial chemicals, agricultural chemicals, and the like.

The invention claimed is:

1. A resin composition comprising a saponified ethylene-vinyl ester-based copolymer (A) having an ethylene content of 29 to 51% by mol and a saponification degree of 94 to 100% by mol, and a completely dehydrated product (B) of a hydrated aliphatic carboxylic acid salt having 2 to 10 carbon atoms in the form of a powder, at least 50% by volume of which passes 100 mesh based on ASTM E11-04, wherein the weight ratio of (A) to (B) is from 85/15 to 99/1.

2. The resin composition according to claim 1, wherein (B) is a completely dehydrated product of monobasic to tetrabasic hydrated carboxylic acid salt.

3. A melt formed article containing the resin composition according to claim 1.

4. A multilayer structure having at least one layer of the resin composition according to claim 1.

5. A process for producing the resin composition according to claim 1, which comprises melt-mixing (A) with (B).

6. The resin composition according to claim 1, wherein (B) is a completely dehydrated product of hydrated carboxylic acid salt having 2 to 6 carbon atoms.

7. The resin composition according to claim 6, wherein the weight ratio of (A) to (B) is from 90/10 to 99/1.

8. The resin composition according to claim 1, wherein the weight ratio of (A) to (B) is from 90/10 to 99/1.

9. A multilayer structure comprising a layer containing a saponified ethylene-vinyl ester-based copolymer having an ethylene content of 29 to 51% by mol and a saponification degree of 94 to 100% by mol, as an intermediate layer and layers each containing a thermoplastic resin containing at least one selected from a polyamide-based resin, a polyolefin-based resin, a polyester-based resin, and a polystyrene-based resin provided on both sides of the intermediate layer, wherein at least one layer of the layer containing the saponified ethylene-vinyl ester-based copolymer and the layer to be laminated on the layer containing the saponified ethylene-vinyl ester-based copolymer contains a completely dehydrated product (B) of a hydrated aliphatic carboxylic acid salt having 2 to 10 carbon atoms in the form of a powder, at least 50% by volume of which passes 100 mesh based on ASTM E11-04, and wherein the weight ratio of the saponified ethylene-vinyl ester-based copolymer (A) to the completely dehydrated product (B) of hydrated aliphatic carboxylic acid salt is from 85/15 to 99/1.

10. The multilayer structure according to claim 9, wherein the layer containing the saponified ethylene-vinyl ester-based copolymer further contains the polyamide-based resin in an amount of 1 to 40% by weight relative to the saponified ethylene-vinyl ester-based copolymer.

* * * * *